June 3, 1958 I. WOLFF 2,837,735

PULSE ECHO RADIO LOCATOR SYSTEM

Filed Sept. 30, 1938

Inventor

Irving Wolff

By

I. Wolff

Attorney

United States Patent Office 2,837,735

Patented June 3, 1958

2,837,735

PULSE ECHO RADIO LOCATOR SYSTEM

Irving Wolff, Merchantville, N. J., assignor to Radio Corporation of America, New York, N. Y., a corporation of Delaware Application September 30, 1938, Serial No. 232,647

46 Claims. (Cl. 343—11)

My invention relates to radio vision, the term "radio vision" being applied to pictures in two coordinates and to three-dimensional space pictures which are built up from signals derived from reflected radio waves.

Figures 1, 2, 3, 4:
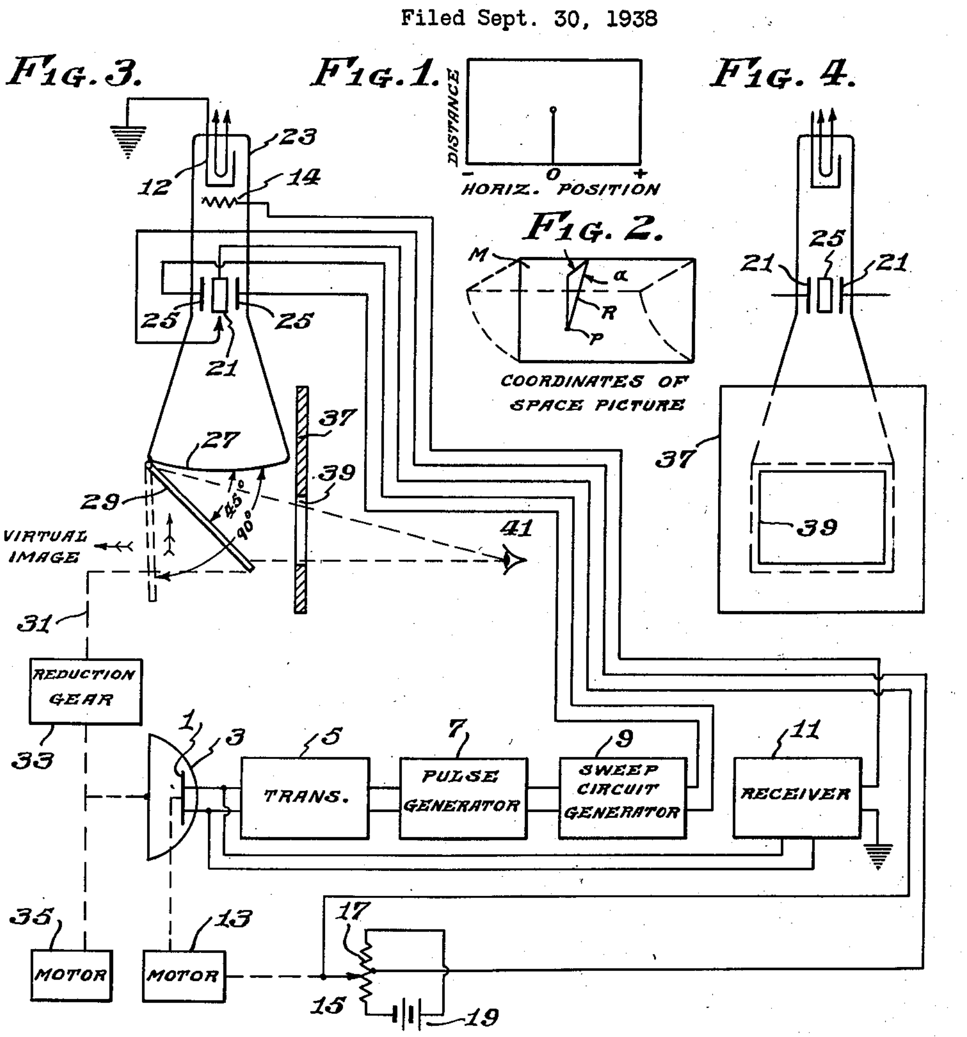
Figures 5, 6:
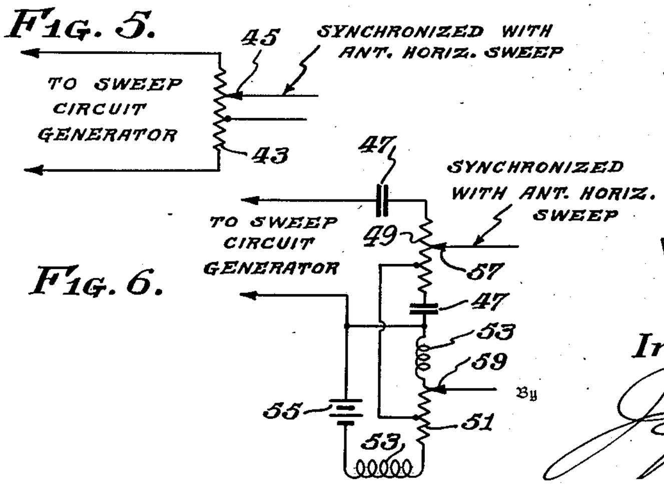
Figure 5A:
Figure 6A:

The invention will be described by reference to the accompanying drawings, in which Figures 1 and 2 are illustrations of the types of coordinates employed in the invention, Figure 3 is a schematic diagram of one embodiment of the invention, Figure 4 is a front elevational view of a portion of Fig. 1, Figures 5 and 5*a* are, respectively, modified means for scanning and the resulting scanning area, and Figures 6 and 6*a* are, respectively, further modified means for scanning and the resulting scanning area.

Distance may be indicated by utilizing reflected radio waves. A pulse of radio frequency energy is directively radiated. An object in the path of the pulse reflects the pulse. The received reflected pulse modulates or deflects a cathode ray which is being swept along a line in synchronism with the transmission of the pulse. The initial or starting position of the cathode ray sweep indicates zero distance and end of the sweep the maximum measurable distance. Deflections intermediate these limits correspond to the distance from the transmitter to the object.

In a somewhat similar manner a two-dimensional picture may be built up by transmitting a beam of radio frequency energy. The scene to be pictured is scanned by combining distance indication and horizontal or vertical movements of the radio beam. In this system the distance indication described above is combined with horizontal or vertical indications. The distance coordinate may be represented by the vertical movements of a cathode ray trace and the horizontal direction or coordinate by the horizontal trace. The distance and horizontal coordinates for a point or object A are illustrated in Fig. 1 where the spot A' appearing on the cathode ray tube screen is a representation or image of object A. This arrangement of coordinates is especially suitable for reproduction of scenes in the horizontal plane. If the scene is to be reproduced in the vertical plane, the coordinates are preferably interchanged. It should be understood that the cathode ray is moved in one direction in synchronism with the angular movements of the radio beam.

If a two-dimensional picture in the vertical and horizontal planes is continuously "effectively" combined with the distance coordinate, the essentials of a three-dimensional space picture will be realized.

I have found that such a picture can be produced by utilizing a novel "distance scanning device." Instead of viewing directly the cathode ray screen, an image is formed by means of a mirror or equivalent optical system. The mirror is arranged so that its reflecting surface is viewed by the observer as the mirror is oscillated from a position of approximately 90° to approximately 45° to the screen. The effect of the mirror oscillation is to cause the image of the screen to move from a horizontal to a vertical position, if the cathode ray screen is in a horizontal plane.

The space occupied by one form of such picture is represented in perspective in Fig. 2. The image of a point P is represented in cylindrical coordinates in Fig. 2, which corresponds to the space or volume occupied by the successive images of the screen of the cathode ray tube as formed by the mirror. The coordinates are as follows: (*a*) The distance coordinate is represented by the length R of the line between the axis M and the point P; (*b*) the vertical angular position of the point P is indicated by the angle $\alpha$; and (*c*) the horizontal angular position is indicated by the position of the point with respect to the zero O of the reference axis. The foregoing coordinates are obtained (*a*) by making the "fore and aft" position of the spot on the cathode ray screen correspond to the distance of the reflecting object, as previously explained; (*b*) by synchronizing the angular position of the mirror so that it moves with half the vertical angular velocity of the radio beam scanning; and (*c*) by synchronizing the horizontal position of the spot on the cathode ray tube with the horizontal angular position of the radio beam.

Consideration of the nature of the foregoing system of coordinates and image shows that a space picture having satisfactory perspective will be obtained. It follows that there are many uses of the device. For example, the system may be installed on an airplane to reproduce a space picture of a landing field which may be invisible. Another use is to indicate the space position of invisible objects. It should be understood, however, that the invention is not limited to any particular use.

One of the objects of my invention is to provide means for establishing a two-dimensional picture. Another object is to provide means for establishing a three-dimensional space picture. Another object is to provide means whereby reflected radio pulses may be converted into signals, which are built up into images representing the reflecting objects. A further object is to provide means for scanning a scene by radio pulses, and reproducing the scene as an image built up in three dimensions from the signals reflected from the scene. A still further object is to provide means for establishing a three-dimensional space picture having different types of coordinates.

Referring to Fig. 3, an antenna 1 is arranged within a reflector 3. The antenna and reflector are arranged for horizontal and vertical scanning, as hereinafter described. The antenna is connected to a transmitter 5, which is connected to a generator 7. The pulse generator 7 is also coupled to a sweep circuit generator 9. The antenna 1 is also preferably connected to a radio receiver 11, although separate antenna arrays may be used for transmitting and receiving.

Horizontal scanning may be effected by horizontally moving the antenna array through the desired angle by a motor 13 provided with the necessary mechanical coupling to the antenna array. Instead of moving the whole array, the antenna may be moved with respect to the focus of the reflector, or several antennas, differently focused, may be successively energized. Whichever scanning means are employed, a horizontal deflection means 15 is operated in synchronism therewith. One suitable deflection means is a potentiometer 17 and battery 19. The slider of the potentiometer is operated by the scanning motor 13. The potentiometer and slider are connected to the horizontal deflecting electrodes 21 of a cathode ray tube 23. The other deflecting electrodes 25, hereinafter called the "vertical" or "distance" deflecting electrodes, are connected to the sweep circuit generator 9. The output of the receiver 11 is connected to the cathode 12 and control electrode 14 of the cathode ray tube.

The cathode ray tube is arranged with its screen 27 in a horizontal plane. A plane mirror 29 is hinged adjacent the screen, and arranged so that the mirror may be oscillated through the angles of approximately 45° to slightly less than 90° from the plane of the screen. The mirror movement or scanning is effected by mechanically coupling 31 the mirror, through a reduction gear 33, to a motor 35 which actuates the array for vertical scanning. When the radio beam is horizontally directed, the mirror is in the 90°–K° position. When the radio beam is vertically directed, the mirror is in the 45° position. The reduction gear 35 provides the necessary ratio of movement. A screen 37, including a suitable aperture 39, is arranged between the cathode ray screen and the eyes 41 of the observer.

In the operation of the system the beam of radio pulses is rapidly directed through the desired angle in the horizontal plane. The cathode ray is deflected horizontally in synchronism with the radio beam. The radio beam is also directed through a desired angle in the vertical plane and the mirror is oscillated in synchronism therewith. The cathode ray is deflected in the "distance or depth" coordinate by the sweep circuit generator potentials which are applied to the vertical or distance deflecting electrodes. Received reflected pulses, applied to the cathode ray control electrode, establish indications on the screen. These indications are horizontally displaced as a function of the angle between the start of the horizontal radio sweep and the reflecting object. The indication has a "vertical" dimension which is a function of the angle between the beginning of the vertical radio sweep and the reflecting object.

The foregoing system reproduces a space picture in three dimensions. The space picture thus reproduced will have perspective. In some uses of the system other than a perspective view may be desirable. To produce such views, a supplementary variation in the sweep circuit generator voltage is obtained as shown in Fig. 5. The voltage from the sweep circuit generator is applied to a potentiometer 43. The variable contact 45 of the potentiometer is moved in synchronism with the horizontal scanning movements of the antenna. The area of the cathode ray scanning will thus be made triangular as shown in Fig. 5*a*. The resulting image produced by the mirror scanning will represent objects in angular position in the horizontal as well as vertical planes.

In some installations, for example in aircraft, it may be helpful to reproduce a space picture which has sight lines between angular representation and perspective. One suitable modification for this type of picture is shown in Fig.6. The potentials from the sweep circuit generator are applied through capacitors 47 to a potentiometer 49. A second potentiometer 51 is connected through choke coils 53 to a battery 55. The two potentiometers 49, 51 are connected together. The scanning voltages are obtained by connections to the variable contacts 57, 59 which are moved in synchronism with the antenna horizontal sweep. The resulting cathode ray scanning pattern covers a trapezoidal pattern as shown in Fig. 6*a*.

Thus the invention has been described as a radio vision device. The scene to be reproduced is scanned vertically and horizontally by a beam of radio pulses. In synchronism with the radio scanning a cathode ray is scanned across the fluorescent screen of a cathode ray tube. The depth position of the indication on the screen is synchronized as a function of the distance travelled by the radio pulses. A mirror, which is suitably positioned with respect to the screen which is in a horizontal plane, scans the screen. The mirror scanning is in synchronism with the radio beam vertical scanning. The resulting image produces a three-dimension space picture. It should be understood that the images may be formed at a rate which produces a persistent picture, or the images may be formed more slowly whereby the scene is analyzed rather than reproduced as a whole.

I claim as my invention:

1. A radio vision device including means for scanning by radio energy a two coordinate scene to be reproduced, said coordinates corresponding respectively to the angular position of the reflecting elements of said scene and to the distances from the point of scanning to the reflecting elements of said scene measured directly as a function of the velocity and time of transit of said energy, means for deriving visual indications of reflections of said energy and means for arranging said indications for reproducing said scene in Cartesian coordinates corresponding to said original scene coordinates.

2. A radio vision device including means for scanning by radio energy a scene to be reproduced as a function of the reflections of said energy, means for deriving visual indications of reflections of said energy, and means for arranging said indications as an image reproducing said scene in three dimensions, one of said three dimensions corresponding to the actual distance from the point of scanning to the reflecting elements of said scene measured directly as a function of the velocity and time of transit of said energy.

3. A radio vision device including means for transmitting a radio beam, means for directing said beam whereby a scene may be scanned, means for receiving radio beam reflections from said scene, means for deriving visual indications from said reflections and means for building up said indications into a three-dimensional picture.

4. A device for reproducing visibly a scene in three dimensions including in combination means for radiating a radio beam, means for directing said beam across said scene along two coordinates, means for receiving reflections from said scene, means operated in synchronism with said scanning for producing visible indications of said reflections as functions of said coordinates, means for indicating the distances of objects causing said reflections, and means including said third mentioned means for forming an image of said visible indications indicating said distances.

5. In a device of the character of claim 4, means for synchronizing the operating of said second and last mentioned means.

6. In a system for reproducing a three-dimensional picture of a scene, the combination of means including a radio beam for scanning said scene as functions of vertical, horizontal, and distance coordinates to produce radio beam reflections from objects within said scene, means for receiving said reflections from objects within said scene, means for producing visible indications of said reception, and means for arranging said indications as an image along coordinates corresponding respectively to said first mentioned coordinates.

7. In a system of the character of claim 6, means for altering one of the last mentioned coordinates.

8. In a system of the character of claim 6, means for altering one of the last mentioned coordinates whereby the image is arranged along two rectangular coordinates and a third coordinate oriented at other than a right angle with respect to said two rectangular coordinates.

9. The method of reproducing a two coordinate scene as a two-dimensional picture, which includes transmitting a beam of radio frequency energy, scanning said scene by deflecting said beam through an angle to obtain angular position information, receiving said energy after reflections from objects within said scene, deriving visible indications from said received reflections, determining directly the time interval between said transmission and reception, arranging said indications along an axis corresponding to said angular deflection, further arranging said indications along a distance axis as a function of said time interval, said distance axis being at right angles to the first axis, and forming said indications into an image arranged in two dimensions whereby said picture is presented in rectangular coordinates.

10. The method of reproducing a scene as a three-dimensional picture which includes transmitting a beam of radio frequency energy, scanning said scene by deflecting said beam over the scene along vertical and horizontal coordinates, receiving said energy after reflections from objects within said scene, deriving visible indications from said received reflections, arranging said indications along coordinates corresponding to said vertical and horizontal coordinates, further arranging indications along a distance coordinate as a function of the time interval between transmission and reception, and forming said indications into an image arranged in three dimensions.

11. The method described in claim 10 together with the step of altering one of the coordinates of the received indications so that the said three dimensions approach a desired coordinate system.

12. The method of producing a three-dimension picture of a scene which includes transmitting a beam of pulses of radio frequency energy, directing said beam over said scene along two coordinates, receiving said pulses after reflection from objects in said scene, converting said reflected pulses into visible indications, arranging said indications along coordinates corresponding to said two coordinates, introducing the time interval between transmission and reception as a distance coordinate for said indications, and forming an image in which said indications are located with respect to said three coordinates as the objects in said scene are located with respect to similar coordinates.

13. A radio vision device including means for scanning by radio energy a two coordinate scene to be reproduced, said coordinates corresponding respectively to the angular position of the reflecting elements of said scene and to the distances from a point of scanning to the reflecting elements of said scene measured directly as a function of the velocity and time of transit of said energy, means for deriving visual indications of reflections of said energy, and means for arranging said indications as a trapezoidal representation of said scene.

14. The method of reproducing a two coordinate scene as a two dimensional picture which includes transmitting a beam of radio frequency energy, scanning said scene by deflecting said beam along one coordinate, receiving said energy after reflections from objects within said scene, deriving visible indications from said received reflections, determining directly the time interval between said transmission and reception, arranging said indications along a coordinate corresponding to said one coordinate, further arranging said indications along a distance coordinate as a function of said time interval, and forming said indications into an image corresponding to a trapezoidal representation of said scene.

15. A system for surveying a scene by radio waves comprising means for radiating radio waves to cover said scene, means for directively receiving reflections of said radio waves from the objects and obstacles included in said scene, means operatively connected with said directive receiving means to provide an indication of the successive directions or azimuth angles from which reflections are being received, means for determining the several distances of the respective reflecting objects and obstacles in terms of the respective time intervals of reflection, and means for displaying the several distances visually in pictorial form the horizontal dimension of which accords with that of the actual field of view, said last-stated means comprising a mobile element, a target over which said mobile element may be moved, means cooperatively connected with said direction indicating means to laterally deflect said mobile element with respect to said target over a horizontal distance representing the range of azimuth angles of the directive receiver and in synchronism with the movement of said directive receiver, means cooperatively connecting with said distance determining means to vertically deflect said mobile element with respect to said target over a vertical distance representing the range of distances being determined and in synchronism with the distance determining action of said distance determining means, and means responsive to indications provided by said distance determining means operatively connected with said mobile element to cause it to produce an indication on said target for each indication provided by said distance determining means, whereby a pattern of indications is obtained upon said target, each indication representing by its lateral position the azimuth angle and by its vertical position the distance of an obstacle or reflecting object within the scene surveyed.

16. In combination, a directional antenna system having a directional pattern which may be swung through an angle to scan objects located within said angle, means including said antenna system for radiating radio waves to said objects and for receiving energy from said objects in response to said radiation, means operatively connected with said directional antenna system to provide an indication of the successive directions or azimuth angles from which said energy is being received, means for determining the several distances of the respective objects in terms of the respective time intervals of reception of said energy, and means for displaying the several distances visually in pictorial form, the horizontal dimension of which accords with that of the actual field of view, said last-stated means comprising a cathode ray tube having a target over which the cathode ray of said tube may be moved, means cooperatively connected with said antenna system to laterally deflect said cathode ray with respect to said target over a horizontal distance representing the range of azimuth angles of said directional pattern and in synchronism with the movement of said pattern, means cooperatively connecting with said distance determining means to vertically deflect said cathode ray with respect to said target over a vertical distance representing the range of distances being determined and in synchronism with the distance determining action of said distance determining means, and means responsive to indications provided by said distance determining means operatively connected with said cathode ray tube to cause it to produce an indication on said target for each indication provided by said distance determining means, whereby a pattern of indications is obtained upon said target, each indication representing by its lateral position the azimuth angle and by its vertical position the distance of an object within the angle surveyed.

17. In combination, a directional transducer system having a directional pattern which may be swung through an angle to scan the space within said angle whereby objects located within said angle are scanned, means including said system for radiating energy to said objects and for receiving energy from said objects in response to said radiation, means including a cathode ray tube for deriving from said received energy information as to the distance of an object as a function of the velocity and the transit time of said energy and also information as to the direction of an object, said last means including means for deflecting the cathode ray of said tube in one direction to produce a time sweep and means for deflecting said ray in another direction intersecting said one direction at a fixed angle and further including means for producing on said time sweep in response to the reception of energy from an object an indication indicative of the distance to said object, and means for changing the amplitude of said deflection in said other direction in response to and as a function of the direction in which said pattern is pointed.

18. In combination, a directional antenna system having a directional pattern which may be swung through an angle to scan the space within said angle whereby objects located within said angle are scanned, means including said antenna system for radiating pulses of radio energy to said objects and for receiving energy from said objects in response to said radiation, means including a cathode ray tube for deriving from said received energy information as to the distance of said objects as a function of the velocity and the transit time of said energy and also information as to the direction of said objects, said last means including means for deflecting the cathode ray of said tube in one direction in timed relation to said pulse transmission to produce a time sweep and means for deflecting said ray in another direction intersecting said one direction substantially at right angles and further including means for producing on said time sweep in response to the reception of energy from an object an indication indicative of distance to said object, and means for changing the amplitude of said right angle deflection of said ray in response to and as a function of the direction in which said pattern is pointed.

19. In combination, a directional antenna system having a directional pattern which may be swung through an angle to scan the space within said angle whereby objects located within said angle are scanned, means including said antenna system for radiating pulses of radio energy to said objects and for receiving energy from said objects in response to said radiation, a cathode ray tube, means for deflecting the cathode ray of said tube in one direction as a function of time in timed relation to said pulse transmission to produce a time sweep, means for producing on said time sweep in response to the reception of energy from an object an indication indicative of the distance to said object, means for deflecting said ray in a direction substantially at right angles to said one direction, and means for changing the amplitude of said right angle deflection of said ray in response to and as a function of the direction in which said pattern is pointed.

20. In combination, a directional antenna system having a directional pattern which may be swung through an angle to scan the space within said angle whereby objects located within said angle are scanned, means including said antenna system for radiating pulses of radio energy to said objects and for receiving energy from said objects in response to said radiation, a cathode ray tube, a first deflection means associated with said tube to deflect the ray in one direction when said deflection means is energized, a second deflection means associated with said tube to deflect the ray in another direction when said second deflection means is energized, said one direction being substantially at right angles to said other direction, means for producing and applying to said first deflection means a deflection wave for deflecting the cathode ray of said tube in said one direction in timed relation to said pulse transmission to produce a time sweep, means for producing on said time sweep in response to the reception of energy from an object an indication indicative of the distance to said object, means for producing and applying to said second deflection means a deflection signal for deflecting said ray in said other direction, and means for so changing the amplitude of said deflection signal as to cause said deflection in said other direction to increase as said pattern is swung away from a reference position.

21. In combination, a directional antenna system having a directional pattern which may be swung through an angle to scan the space within said angle whereby objects located within said angle are scanned, means including said antenna system for radiating modulated radio energy to side objects and for receiving energy from said objects in response to said radiation, means for deriving from said received energy information including the distance of said object as a function of the velocity and transit time of said energy and also including the angular position of said object, said means for deriving information including a cathode ray tube having a screen, one deflection means for deflecting said ray in one direction, another deflection means for deflecting said ray in another direction intersecting said one direction at a fixed angle, means for applying to said one deflection means a deflection wave which is synchronized with the modulation of said radio energy and which produces a deflection component for deflecting said ray in said one direction at a predetermined speed which is independent of the direction in which said radiation pattern is pointed, means for applying to said other deflection means a deflection signal, and means for changing the amplitude of said deflection signal as a function of the direction in which said pattern is pointed, and means for applying to said cathode ray tube energy received from an object to form an indication on said screen indicative of the distance and angular position of the object.

22. In combination, a directional antenna system having a directional pattern which may be swung through an angle to scan the space within said angle whereby objects located within said angle are scanned, means including said antenna system for radiating radio energy to said objects and for receiving energy from said objects in response to said radiation, a cathode ray tube having a screen, means including said cathode ray tube for deriving from said received energy information as to the distance of said objects as a function of the velocity and the transit time of said energy and also for deriving information as to the direction of said objects and for putting on said screen both said distance and said direction information, said last means including a first deflecting means, means for applying a deflecting wave to said deflecting means to produce a deflection component for deflecting the cathode ray of said tube in one direction only as a function of time to produce a time sweep, means for producing on said time sweep in response to the reception of energy from an object an indication indicative of the distance to said object, a second deflecting means which, when energized, will produce a deflection component to deflect said ray in another direction intersecting said one direction at a fixed angle, means for applying a deflection signal to said second deflecting means to produce a deflection component for deflecting said ray in said other direction only as a function of the direction in which said radiation pattern is pointed.

23. In combination, a directional antenna system having a directional pattern which may be swung through an angle to scan the space within said angle whereby objects located within said angle are scanned, means including said antenna system for radiating radio energy to said objects and for receiving energy from said objects in response to said radiation, means for deriving from said received energy information as to the distance of said objects as a function of the velocity and the transit time of said energy and also information as to the direction of said objects, said deriving means including a cathode ray tube having a screen, a first deflection means which when energized will reflect the cathode ray in the direction of coordinates along a first axis, a second deflection means which when energized will deflect the cathode ray in the direction of coordinates along a second axis which is at a fixed angle to said first axis, means including a deflection wave generating means connected to the first deflection means for presenting the distance information on only the coordinates along said first axis, and means including a signal producing means connected to the second deflection means for presenting the direction information on only the coordinates along said second axis.

24. In a radio locator system, a directional antenna system having a directional pattern which may be swung through an angle to scan the space within said angle whereby objects in said space are scanned, means including said antenna system for radiating pulses of radio energy to said objects and for receiving energy from said objects in response to said radiation, a display device having a display surface that may be scanned, means for scanning said surface along one direction in timed relation to said pulse transmission to produce a time sweep scan, means for producing an indication during said time sweep scan in response to the reception of energy from said objects, said indication being indicative of the distances to said objects, means for scanning said surface along another direction which is at a fixed angle to said one direction, and means for causing the scan along said other direction to be a function of the position of said directional pattern.

25. In combination, a directional transducer system having a directional pattern which may be swung through an angle to scan the space involved whereby objects in said space are scanned, means including said transducer system for radiating energy to said objects and for receiving energy from said objects in response to said radiation, means for deriving from said received energy information including the distance of each of said objects as a function of the velocity and transit time of said energy and also including the angular position of each of said objects, means for displaying said information on a single display screen in Cartesian coordinates with the distance information as to each of said objects being displayed as one coordinate and said angular position information as to each of said objects being displayed as the other coordinate.

26. In a radio locator system, a directional antenna system having a directional pattern which may be swung through an angle to scan the space within said angle in a point by point fashion whereby objects in said space are scanned, means including said antenna system for radiating radio energy to said objects and for receiving energy from said objects in response to said scanning, means for deriving from said received energy information including the distance of each of said objects as a function of the velocity and transit time of said energy and also including the angular position of each of said objects, means for displaying said information on a single display screen in two sets of coordinates, one set of coordinates being along one axis, the other set of coordinates being along an axis at right angles to said one axis, said last means including means for displaying said distance information as to said objects as coordinates on said one axis and further including means for displaying said angular position information as to said objects as coordinates on the other axis, said angular information being displayed in point to point correspondence with said point to point scanning by said directional pattern.

27. In combination, a directional antenna system having a directional pattern which may be swung through an angle to scan objects located within said angle, means including said antenna system for radiating radio energy to said objects and for receiving energy from said objects in response to said radiation, means for deriving from said received energy information including the distance of said objects as a function of the velocity and transit time of said energy and also including the angular position of said objects, means for displaying said information on a single display screen in two sets of coordinates with said information displayed as bright spots on said screen, one set of coordinates being along one axis, the other set of coordinates being along an axis at right angles to said one axis, said distance information being displayed as coordinates on said one axis, and said angular position information being displayed as coordinates on the other axis.

28. In a radio locator system, a directional antenna system having a directional pattern which may be swung through an angle to scan the space involved whereby objects in said space are scanned, means including said antenna system for radiating radio energy to said objects and for receiving energy from said objects in response to said radiation, a cathode ray tube, a first deflection means associated with said tube to deflect the ray in one direction when said deflection means is energized, a second deflection means associated with said tube to deflect the ray in another direction intersecting said one direction when said second deflection means is energized, said one direction being substantially at a fixed angle to said other direction, means for producing and applying to said first deflection means a deflection wave for deflecting the cathode ray of said tube in said one direction to produce a time sweep, means for producing on said time sweep in response to the reception of energy from a certain object, an indication indicative of the distance to said certain object, means for producing and applying to said second deflection means a deflection signal of adjustable amplitude for deflecting said ray to some position in said other direction, and means for changing the amplitude of said deflection signal as a function of the direction in which said pattern is pointed to make said position correspond to the direction in which said pattern is pointed.

29. In a radio locator system, a directional antenna system having a directional pattern which may be swung away from a reference position and through an angle to scan reflecting objects located within said angle, means including said antenna system for radiating pulses of radio energy to said objects and for receiving energy from said objects in response to said radiation, a cathode ray tube, a first deflection means associated with said tube to deflect the ray in one direction when said deflection means is energized, a second deflection means associated with said tube to deflect the ray in another direction intersecting said one direction when said second deflection means is energized, said other direction being substantially at right angles to said one direction, means for producing and applying to said first deflection means a deflection wave for deflecting the cathode ray of said tube in said one direction in timed relation to said pulse transmission to produce a time sweep, means for producing on said time sweep in response to the reception of received energy from a certain object an indication indicative of the distance to said certain object, means for producing and applying to said second deflection means a direct-current signal of adjustable amplitude for deflecting said ray to some position in said other direction, and means for so changing the amplitude of said direct-current signal as a function of the position of said radiation pattern as to cause said deflection in said other direction to increase as said pattern is swung away from said reference position.

30. In a radio locator system, a directional antenna system having a directional pattern which may be swung through an angle to scan objects located within said angle, means for swinging said antenna pattern, means including said antenna system for radiating modulated radio energy to said objects and for receiving energy from said objects in response to said radiation, a cathode ray tube having a screen that may be scanned by the cathode ray of said tube, means for scanning said screen by said ray in one direction in timed relation to a modulation of said radio energy transmission, means for changing the intensity of said ray during the scan in said one direction in response to the reception of received energy from an object, means for scanning said screen by said ray in another direction which is substantially at right angles to said one direction, and means including a source of direct-current signal that may be varied in amplitude for causing the scan in said other direction to correspond to and be synchronous with said radiation pattern swinging.

31. In a radio locator system, a directional antenna system having a directional pattern which may be swung through an angle to scan objects located within said angle, means for successively swinging said antenna pattern through said angle, means including said antenna system for radiating modulated radio energy to said objects and for receiving energy from said objects in response to said radiation, a cathode ray tube having a phosphor screen and having means for producing a cathode ray that may be deflected to scan said screen, means for deflecting said ray in one direction in timed relation to a modulation of said energy transmission, means for changing the intensity of said ray during the scan in said one direction in response to the reception of energy from an object to produce an indication on said screen, said indication showing the distance to said object, means for deflecting said ray in another direction which is substantially at right angles to said one direction, and means including a source of direct-current signal which may be varied in amplitude for causing the deflection in said other direction to correspond to and be synchronous with said radiation pattern swinging, said swinging of the radiation pattern to be rapid enough to display simultaneously on said screen the indications produced by energy received from a plurality of objects as said pattern is swung.

32. In a radio locator system, a directional antenna system having a directional pattern which may be swung through an angle to scan the space involved in a point by point fashion whereby objects in said space are scanned, means including said antenna system for radiating radio energy to said objects and for receiving energy from said objects in response to said radiation, a cathode ray tube, a first deflection means associated with said tube to deflect the ray in one direction when said deflection means is energized, a second deflection means associated with said tube to deflect the ray in another direction when said second deflection means is energized, said one direction being substantially at right angles to said other direction, means for producing and applying to said first deflection means a deflection wave for deflecting the cathode ray of said tube in said one direction to produce a vertical time sweep, means for applying to said cathode ray tube received energy from said objects to produce indications indicative of the distances to said objects, means for producing and applying to said second deflection means a direct-current signal of adjustable amplitude for laterally deflecting said ray in said other direction, and means for changing the amplitude of said direct-current signal as a function of the direction in which said pattern is pointed to make the lateral position of said vertical sweep assume a point to point correspondence with the direction in which said pattern is pointed.

33. An indicator for a locator system of the type wherein there is a directional transducer system having a directional pattern which may be swung through an angle to scan objects located within said angle and wherein there is means including said transducer system for radiating pulses of energy to said objects and for receiving energy from said objects in response to said radiation, said indicator comprising a cathode ray tube, a first deflection means associated with said tube to deflect the ray in one direction when said deflection means is energized, a second deflection means associated with said tube to deflect the ray in another direction when said second deflection means is energized, said other direction being substantially at right angles to said one direction, means for producing and applying to said first deflection means a deflection wave for deflecting the cathode ray of said tube in said one direction in timed relation to said pulse transmission to produce a vertical time sweep, means for applying to said cathode ray tube energy received from said objects to produce indications indicative of the distances to said objects, means for producing and applying to said second deflection means a direct-current signal of adjustable amplitude for deflecting said ray laterally in said other direction, and means for so changing the amplitude of said direct-current signal as a function of the position of said directional pattern as to cause said vertical trace to be moved to positions in said other direction in correspondence with the positions of said pattern as said pattern is being swung.

34. An indicator for a radio locator system of the type wherein there is a directional antenna system having a directional pattern which may be swung through an angle to scan objects located within said angle and wherein there is means including said antenna system for radiating pulses of radio energy to said objects and for receiving energy from said objects in response to said radiation, said indicator comprising a cathode ray tube, a first deflection means associated with said tube to deflect the ray in one direction when said deflection means is energized, a second deflection means associated with said tube to deflect the ray in another direction when said second deflection means is energized, said other direction being substantially at right angles to said one direction, means for producing and applying to said first deflection means a deflection wave for deflecting the cathode ray of said tube in said one direction in timed relation to said pulse transmission to produce a vertical time sweep, means for applying to said cathode ray tube energy received from said objects to produce indications indicative of the distances to said objects, means for producing and applying to said second deflection means a direct-current signal of adjustable amplitude for deflecting said ray laterally in said other direction, and means for so changing the amplitude of said direct-current signal as a function of the position of said directional pattern as to cause said vertical trace to be moved to positions in said other direction in correspondence with the positions of said pattern as said pattern is being swung, said means for applying received energy to the cathode ray tube including means for intensity modulating the cathode ray to produce said indications.

35. In combination, a directional transducer system having a directional pattern which is pointed in different directions at different times, means including said transducer system for radiating modulated energy to an object and for receiving energy from said object in response to said radiation, means for deriving from said received energy information including the distance of said object as a function of the velocity and transit time of said energy and also including the angular position of said object, said means for deriving information including a cathode ray tube having a screen which may be scanned by the cathode ray, a plurality of deflecting means for deflecting the cathode ray, one of said deflecting means providing a deflecting field to deflect said ray in one direction, another of said deflecting means providing a deflecting field to deflect said ray in another direction intersecting said one direction, means for applying simultaneously to said one deflecting means and to said other deflecting means deflection waves which are synchronous with the modulation of said radiated energy, and means for changing the amplitude of the deflection wave applied to at least one of said deflection means as a function of the direction in which said pattern is pointed.

36. In combination, a directional antenna system having a directional pattern which may be swung to point it toward an object, means including said antenna system for radiating pulses of radio energy to said object and for receiving energy from said object in response to said radiation, means for deriving from said received energy information including the distance of said object as a function of the velocity and transit time of said energy and also including the angular position of said object, said means for deriving information including a cathode ray tube having a screen which may be scanned by the cathode ray, one deflection means for deflecting said ray in one direction, another deflection means for deflecting said ray in another direction intersecting said one direction, means for applying to said one deflection means a deflection wave which is synchronized with said pulse radiation and which produces a deflection component for deflecting said ray, means for also applying to said other deflection means said deflection wave, and means for changing the amplitude of the deflection wave applied to at least one of said deflection means as a function of the direction in which said pattern is pointed.

37. An indicator for a locator system of the type including a directional transducer system having a directional pattern which may be swung to point it toward an object and wherein there is means including said transducer system for radiating modulated energy to said object and for receiving energy from said object in response to said radiation, said indicator comprising a cathode ray tube having a screen, one deflection means for deflecting the cathode ray in one direction, another deflection means for deflecting said ray in another direction intersecting said one direction at a fixed angle, means for producing a time sweep deflection wave synchronous with the modulation of said radiated energy, means for applying to said one deflection means said time sweep deflection wave, means for also applying to said other deflection means said time sweep deflection wave, and means for changing the amplitude of the deflection wave applied to at least one of said deflection means as a function of the direction in which said pattern is pointed, and means for applying a signal to said cathode ray tube in response to the reception of energy from said object.

38. An apparatus for producing indications of range and direction of remote objects comprising means for producing a directional beam of radio pulses which are radiated, means for continually swinging said beam to point it toward different objects, means for producing on a cathode ray tube a radial line sweep synchronized with said radio pulses and for continually swinging said radial line sweep in synchronism with the swinging of said beam, said last means including deflection means responsive to an applied deflecting wave for deflecting the cathode ray in one direction and to another applied deflecting wave for deflecting the cathode ray in another direction intersecting said one direction at a fixed angle, means for producing said deflecting waves synchronously with said radio pulses and applying them to said deflecting means, means responsive to the movement of said directional beam for changing the amplitude of at least one of said deflecting waves in accordance with the movement of said beam, and means producing indications on said radial line sweep responsively to energy received from said objects in response to said radiation.

39. In combination, a directional transducer system having a directional pattern which may be swung to point it toward an object, means including said transducer system for radiating modulated energy to said object and for receiving energy from said object in response to said radiation, display means including means for producing an indication, and deflection means responsive to one applied signal for deflecting said indication along one coordinate of said display means and to a second applied signal for deflecting said indication along a second coordinate of said display means angularly displaced from said first coordinate; means producing first and second deflecting signals synchronously with the modulation of said energy and means applying said signals to said deflection means; and means responsive to the movement of said directional pattern for changing the amplitude of at least one of said deflecting signals in accordance with the movement of said pattern.

40. In a radio locator system wherein modulated energy is radiated, and wherein a time sweep wave is produced in synchronism with the modulation of said energy, means for rotating the plane of deflection in an indicating system of the type including a cathode ray tube having first and second angularly displaced deflecting means, and including conducting paths through which said time sweep wave may be applied to said deflecting means, said means for rotating said plane comprising means for supplying to one of said paths said time sweep wave with the wave varied in amplitude to thereby control the deflection of the cathode ray beam of said tube in one direction in accordance with said amplitude modulated wave, and further comprising means for supplying the time sweep wave to another of said paths to thereby control the deflection of the cathode ray beam with the wave applied to said other deflecting means in a direction at a fixed angle to the direction of the first deflection.

41. In a radio locator system of the type wherein modulated radio energy is transmitted, wherein a directional antenna system having a directional pattern is employed, and wherein a time sweep wave is produced synchronously with the modulation of the radio energy, means for rotating the plane of deflection in an indicating system wherein there is employed a cathode ray tube and wherein the position of said plane of deflection is to indicate the position of said directional pattern, said means for rotating said plane comprising means for supplying said time sweep wave to one of a plurality of conducting paths, and further comprising means for varying the amplitude of the time sweep wave supplied to said one path as a function of the position of said directional pattern, and further comprising means for controlling the deflection of the cathode ray beam of said tube in one direction in accordance with said amplitude modulated wave, and further comprising means for supplying said time sweep wave to another of said paths, and further comprising means for controlling the deflection of the cathode ray beam with the time sweep wave supplied to said other path in a direction at a fixed angle to the direction of the first deflection.

42. In a locator system of the type wherein modulated energy is transmitted, wherein a directional transducer system having a directional pattern is employed, and wherein a time sweep wave is produced synchronously with the modulation of the energy, an indicating system, a cathode ray tube having a plurality of deflecting means which are angularly displaced with respect to each other about the longitudinal axis of said tube, a plurality of signal paths each of which is connected to a separate one of said deflecting means, and means for applying to each of said paths said time sweep wave and means for varying the amplitude of the time sweep wave signal applied to at least one of said paths to cause rotation of the plane of deflection of said cathode ray in correspondence with the position of the directional pattern.

43. In combination, a directional antenna system having a directional pattern which may be swung through an angle to scan the space within said angle whereby objects located within said angle are scanned, means including said antenna system for radiating modulated radio energy to said objects and for receiving energy from said objects in response to said radiation, a cathode ray tube, one deflection means for deflecting the cathode ray of said tube in one direction, another deflection means for deflecting said ray in another direction intersecting said one direction at a fixed angle, means for applying to said one deflection means a deflection wave which is synchronized with said modulation and which produces a deflection component for deflecting said ray, means for also applying to said other deflection means a deflection wave which is synchronous with said modulation, and means for changing the amplitude of the deflection wave applied to at least one of said deflection means as a function of the direction in which said pattern is pointed, and means for applying to said cathode ray tube a signal in response to the reception of said energy.

44. In a radio locator system, a directional antenna system having a directional pattern which may be swung in different directions to be pointed toward an object, means including said antenna system for radiating modulated radio energy to said object and for receiving energy from said objects in response to said radiation, means including a cathode ray tube for deriving from said received energy information as to the distance of said object as a function of the velocity and the transit time of said energy and also information as to the direction of said object, said last means including first deflecting means, means for applying a deflecting wave to said deflecting means for deflecting the cathode ray of said tube in one direction in timed relation to the modulation of said energy and at a speed independent of the direction in which said pattern is pointed to produce a time sweep, means for producing on said time sweep in response to the reception of energy from an object an indication indicative of the distance to said object, second deflecting means which, when energized, will deflect said ray in another direction intersecting said one direction at a fixed angle, means for applying to said second deflecting means a deflecting wave that is synchronous with said modulation for deflecting said ray, and means for changing the amplitude of the deflection produced by the second deflecting means in response to and as a function of the direction in which said pattern is pointed.

45. In a radio locator system, a directional antenna system having a directional pattern which may be swung in different directions to be pointed toward an object, means including said antenna system for radiating modulated radio energy to said object and for receiving energy from said object in response to said radiation, means including a cathode ray tube for deriving from said received energy information as to the distance of said object as a function of the velocity and the transit time of said energy and also information as to the direction of said object, said last means including first deflecting means, means for applying a deflecting wave to said deflecting means for deflecting the cathode ray of said tube in timed relation to the modulation of said energy and at a speed independent of the direction in which said pattern is pointed to produce a time sweep, means for producing on said time sweep in response to the reception of energy from said object an indication indicative of the distance to said object, second deflecting means which, when energized, will deflect said ray at right angles with respect to the deflection produced by the first deflecting means, means for applying to said second deflecting means a deflecting wave that is synchronous with said modulation for deflecting said ray, means for changing the amplitude of said last mentioned deflecting wave in response to and as a function of the direction in which said pattern is pointed, means for supplying a direct-current signal to said second deflecting means, and means for varying the amplitude of said direct-current signal as a function of the direction in which said pattern is pointed.

46. In a radio locator system, a directional transducer system having a directional pattern which may be swung through an angle to scan the space within said angle whereby objects in said space are scanned, means including said transducer system for radiating modulated energy to said objects and for receiving energy from said objects in response to said radiation, a display device having a display surface on which indicia may be made to appear, means for producing a time sweep signal synchronously with said modulation, means for varying said time sweep signal in amplitude as a function of the position of said directional pattern to produce a deflection signal, means for producing indicia on said display surface in response to said received energy, means for positioning said indicia in the direction of coordinates along one axis on said display surface as a function of said time sweep signal, means for also positioning said indicia in the direction of coordinates along another axis on said display surface as a function of said deflection signal, said two axes being at a fixed angle with respect to each other, whereby the position of each of said indicia is indicative of the distance and direction of the object producing the indicium.

References Cited in the file of this patent

UNITED STATES PATENTS

| | | |
|---|---|---|
| 1,876,272 | Bayer | Sept. 6, 1932 |
| 1,924,174 | Wolf | Aug. 29, 1933 |
| 2,055,883 | Terry | Sept. 29, 1936 |
| 2,075,808 | Fliess | Apr. 6, 1937 |
| 2,083,292 | Cawley | June 8, 1937 |
| 2,121,771 | Jones | June 21, 1938 |
| 2,134,716 | Gunn | Nov. 1, 1938 |
| 2,151,549 | Becker | Mar. 21, 1939 |
| 2,189,549 | Hershberger | Feb. 6, 1940 |
| 2,226,860 | Greig | Dec. 31, 1940 |
| 2,231,929 | Lyman | Feb. 18, 1941 |
| 2,412,631 | Rice | Dec. 17, 1946 |

FOREIGN PATENTS

| | | |
|---|---|---|
| 373,196 | Great Britain | May 18, 1932 |
| 812,975 | France | Feb. 15, 1937 |
| 813,404 | France | Feb. 22, 1937 |
| 820,350 | France | July 26, 1937 |

OTHER REFERENCES

"Engineering Test Manual for May 1937 Experimental Types of Detectors Against Aircraft," May 17, 1937, 26 pages.

"Signal Corps Laboratory Annual Report for Fiscal Year 1937 on Means of Detecting the Approach of Aircraft," June 30, 1937, 51 pages.

Affidavit of Clarence A. Boddie, dated December 20, 1945, 8 pages and 1 large sheet of drawing.

U. S. DEPARTMENT OF COMMERCE

PATENT OFFICE

CERTIFICATE OF CORRECTION

Patent No. 2,837,735 Irving Wolff June 3, 1958

It is hereby certified that error appears in the printed specification of the above numbered patent requiring correction and that the said Letters Patent should read as corrected below.

Column 7, line 66, for "side" read -- said --; column 8, line 56, for "reflect" read -- deflect --.

Signed and sealed this 5th day of August 1958.

(SEAL)

Attest:

KARL H. AXLINE

Attesting Officer

ROBERT C. WATSON

Commissioner of Patents